United States Patent
Groe

Patent Number: 6,163,708
Date of Patent: Dec. 19, 2000

[54] CLOSED-LOOP POWER CONTROL METHOD

[75] Inventor: John B. Groe, Poway, Calif.

[73] Assignee: Nokia Mobile Phones Limited, Espoo, Finland

[21] Appl. No.: 09/224,653

[22] Filed: Dec. 31, 1998

[51] Int. Cl.[7] ................................................ H04B 7/00
[52] U.S. Cl. .......................... 455/522; 455/68; 455/69; 455/70
[58] Field of Search ................. 455/522, 68, 69, 455/70

[56] References Cited

U.S. PATENT DOCUMENTS

| | | | |
|---|---|---|---|
| 5,461,639 | 10/1995 | Wheatley, III et al. | 375/205 |
| 5,604,730 | 2/1997 | Tiedemen, Jr. | 370/252 |
| 5,689,814 | 11/1997 | Hagisawa et al. | 455/69 |
| 5,751,763 | 5/1998 | Bruckert | 375/200 |
| 5,799,005 | 8/1998 | Soliman | 370/335 |
| 5,812,938 | 9/1998 | Gilhousen et al. | 455/69 |
| 5,896,411 | 4/1999 | Ali et al. | 375/200 |
| 5,943,610 | 8/1999 | Endo | 455/69 |
| 5,983,082 | 11/1999 | Hilbert | 455/76 |
| 6,011,980 | 1/2000 | Nagano et al. | 455/572 |
| 6,016,422 | 1/2000 | Bartusiak | 455/76 |
| 6,041,081 | 3/2000 | O et al. | 375/297 |

*Primary Examiner*—Curtis A. Kuntz
*Assistant Examiner*—Barry W. Taylor
*Attorney, Agent, or Firm*—Robert H. Kelly; Holland & Hart LLP

[57] ABSTRACT

A manner by which to effectuate closed-loop power control in a two-way communication system. A switched-current, exponential DAC (digital-to-analog converter) is utilized to generate a reference signal responsive to detection of successive power control bits received by the communication device. The reference signal is step-wise exponentially related to previous values, thereby to cause a step-wise increase, or decrease, in the value of the reference signal. The reference signal is utilized to effectuate an increase or decrease in the power levels of signals generated by the communication device.

20 Claims, 5 Drawing Sheets

CLOSED-LOOP POWER CONTROL METHOD

The present invention describes a power control method used in wireless communications. The method utilizes a switched-current, exponential digital-to-analog converter to alter the gain of a transmitter according to received power control bits. The approach is simple and suitable for fast power control.

BACKGROUND OF THE INVENTION

Communication through the use of wireless communication systems has achieved wide popularity in recent years. Multi-user, wireless communication systems with increased capacity and performance have been implemented as a result of advancements in digital communication technologies. These communication services have become affordable, further increasing their popularity.

In a wireless communication system, a radio communication channel extends between a sending station and a receiving station. The radio channel is defined upon a portion of the electromagnetic spectrum. This communication link between the sending and receiving stations is wireless and does not require a wire line connection. Communication can thereby be untethered.

A cellular communication system is exemplary of a wireless, multi-user radio communication system. Here, several fixed-site base stations are installed to cover a geographical area. By transmitting signals with controlled power, the same frequencies can be re-used at different locations throughout the geographical area. Thereby, communications capacity is maximized. Power control is at the core of cellular system design.

Various standards have been developed for cellular communication systems. Interim standards IS-95 and IS-98, promulgated by the EIA/TIA, are cellular communication standards which rely on CDMA (code division multiple access) communication techniques. In a CDMA communication system, several communication signals share a common frequency channel. In such a communication scheme, the power levels of each user must be regulated to achieve optimal capacity. Power control is needed to ensure that none of the signals overwhelm the other signals.

These interim standards set forth requirements for closed-loop power control. In an exemplary closed-loop power control scheme, power control information is generated and transmitted by the network infrastructure to a mobile handset. The control information is sent in the form of power control bits. When received at the mobile handset, the control bits adjust the level of transmitted power.

The closed loop power control scheme augments open loop power control methods. These schemes use approximation techniques based on the assumption that both the downlink and uplink channels experience similar path losses. Open loop power control schemes are generally slower and less accurate than closed loop power control schemes. Closed loop power control schemes are typically more complex, but, necessary to ensure that the transmitted signals are in compliance with the requirements set forth in the aforementioned standards. Interim standards IS-95 and IS-98 utilize a 800 Hz power control loop. Future standards will exploit faster power control schemes. Future standards will also occupy a wider bandwidth and require finer power control.

Improvements in digital communication techniques permit high-speed data and faster, finer power control. However, conventional closed-loop gain control circuitry is limited in speed and accuracy. As power control times decrease, conventional techniques will become inadequate.

A manner by which to provide for faster closed-loop gain control would be advantageous.

It is in light of this background information related to gain control in a wireless communication system that the significant improvements of the present invention have evolved.

SUMMARY OF THE INVENTION

The present invention advantageously provides a method for fast closed loop gain control. In a typical wireless communication system, gain control is directed by power control bits. The power control bits cause an increase or decrease of the power level of the transmitted signal generated by the mobile handset.

Closed-loop power control is provided by a simple circuit, which exhibits high levels of differential linearity. An embodiment of the present invention is advantageous in a communication device that communicates data at high data rates.

In an IS-95 system, power control bits are transmitted upon a downlink channel by network infrastructure to the mobile station every 1.25 milliseconds. The power control bits direct the mobile station to increase or to decrease the power level of uplink signals transmitted by the mobile station. That is to say, each power control bit increments or decrements the gain of the transmitter amplifier. Interim standard IS-95B calls for the resolution of the gain increase or decrease to be selectable as either 0.25 dB, 0.5 dB, or 1.0 dB. A mobile station that supports an IS-95B system requires this selectivity, which is provided by the present invention.

Data is formatted into successive frames in the interim standard IS-95 system. Sixteen power control bits are associated with each frame of data. Up to sixteen increments or decrements of the gain can occur each frame. When the resolution is 1.0 dB, a maximum range of 16 dB of gain change can be accomplished.

In one implementation, power control bits received at the receiver portion of the mobile handset are provided as digital inputs to a switched-current, exponential DAC (digital-to-analog converter). The switched-current exponential DAC generates an analog output signal that is step-wise exponentially related to its previous value. The analog output of the DAC is applied to the transmitter to control its gain. In one implementation, the output signal of the DAC is used as a reference input to baseband digital-to-analog converters. The baseband digital-to-analog converters generate signals which are applied to an I/Q modulator.

In these and other aspects, a method is provided for controlling the gain level of a communication signal. The mobile handset can receive power control bits which indicate at least relative power levels of the signal to be transmitted. An exponential converter is coupled to receive each successive power control bit received. The exponential converter generates an output signal which is step-wise exponentially related to each successive power control bit. Communication signal DACs generate analog signals that represent the baseband information plus the output of the step-wise exponential power control DAC.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
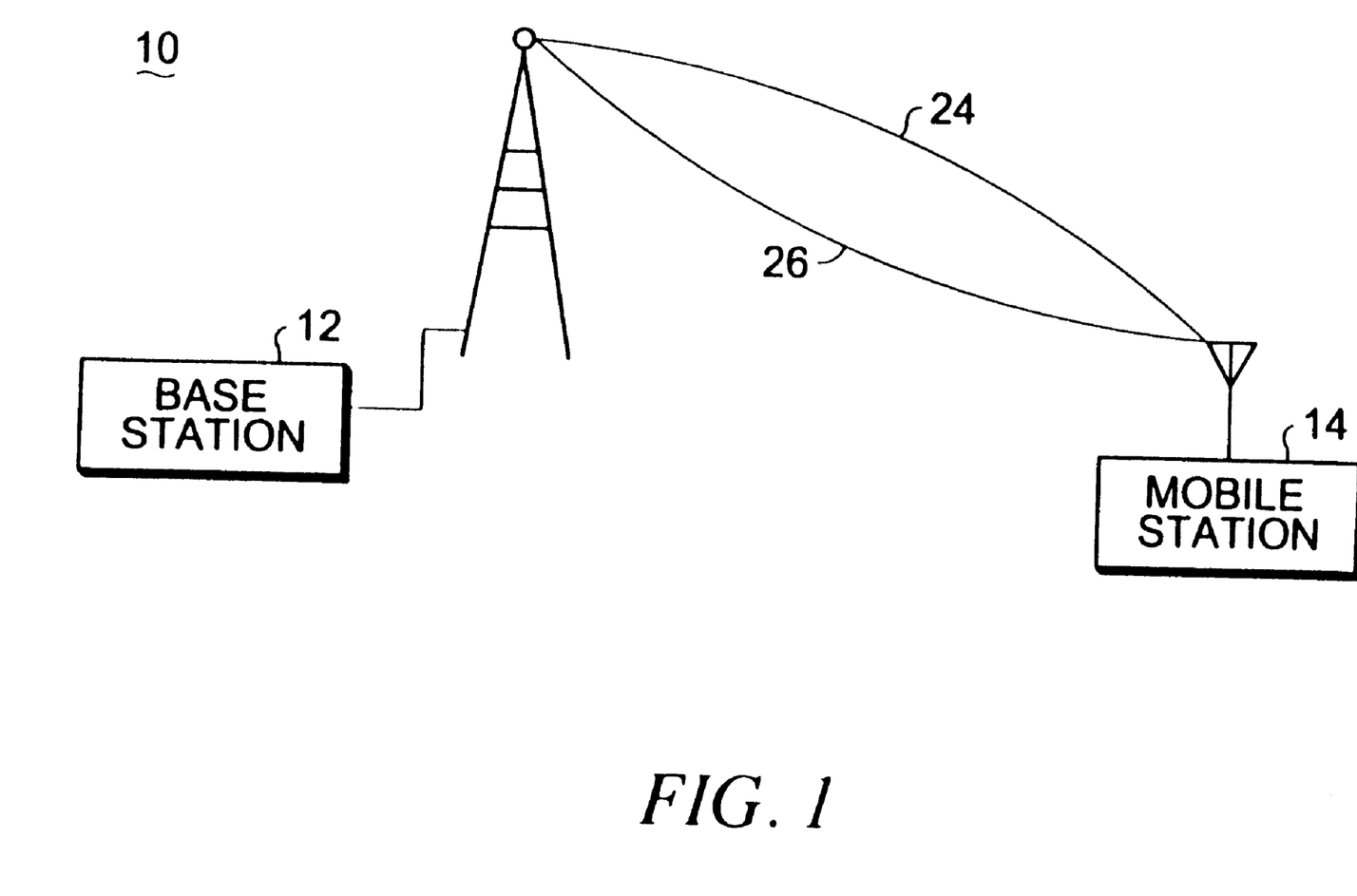
FIG. 1 illustrates a functional block diagram of an exemplary communication system in which an embodiment of the present invention is operable.

Turning first to FIG. 1, an exemplary communication system, shown generally at 10, permits two-way communication between a base station 12, and a mobile station 14. The exemplary communication system 10 shown in the Figure is representative of a CDMA cellular communication system, for example, a system as defined in the IS-95 interim standard developed by the EIA/TIA. An embodiment of the present invention is also operable in other types of communication systems.

Communication signals transmitted over the air interface between the network infrastructure and the mobile station must be at appropriate power levels to ensure that transmitted signals are reliably received. In a CDMA cellular communication system, as well as other radio communication systems, power control bits are transmitted by the network infrastructure to a mobile station to control the power level of the mobile station transmitter.

The line 24 is representative of a downlink channel upon which signals generated by the network infrastructure are transmitted to the mobile station 14. Analogously, the line 26 is representative of an uplink channel upon which uplink signals generated by the mobile station are transmitted to the network infrastructure.

Figure 2:
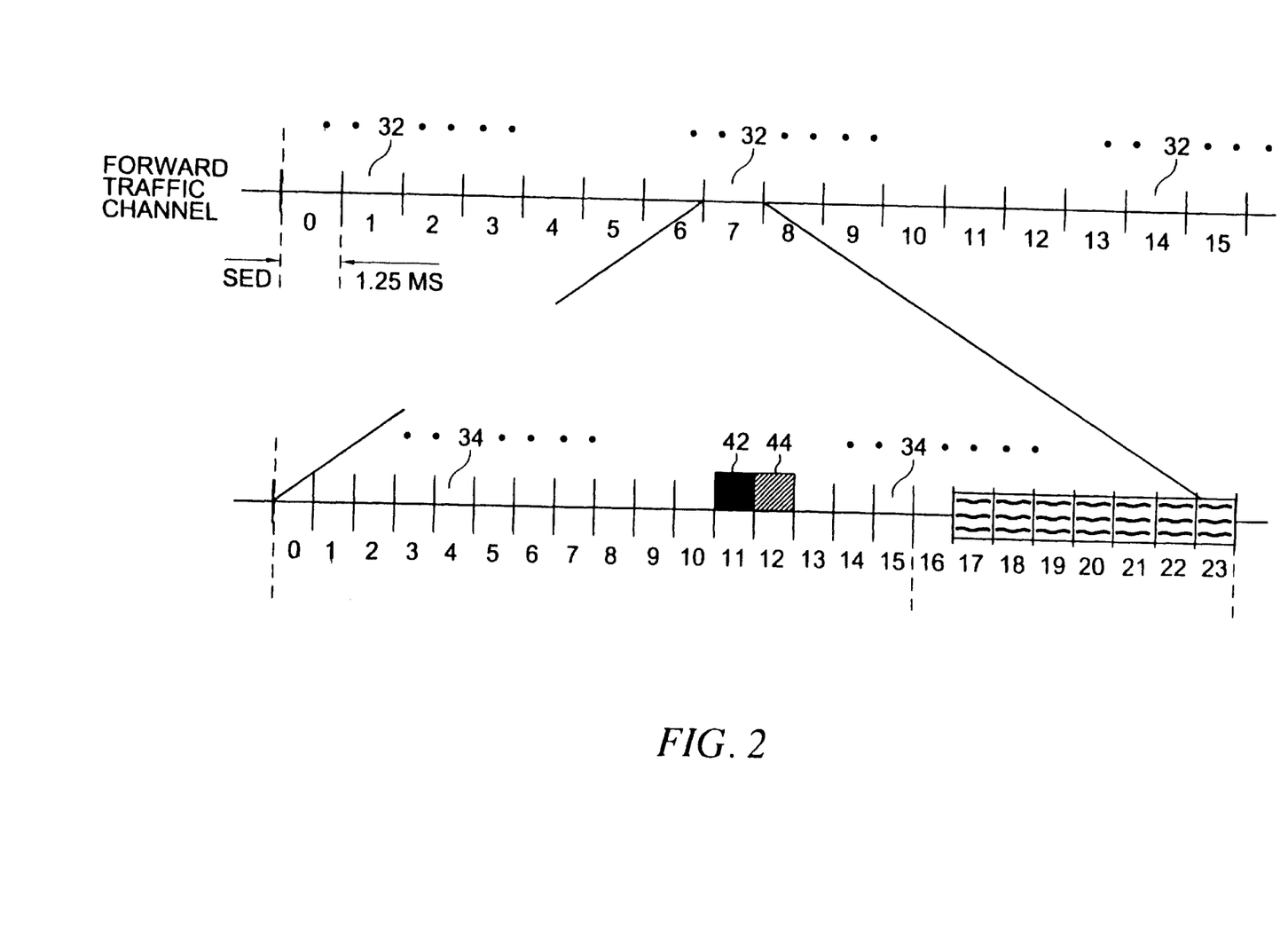
FIG. 2 illustrates a timing diagram showing the formatting scheme pursuant to which power control bits are transmitted upon a downlink channel to the mobile station forming a portion of the communication system shown in FIG. 1.

FIG. 2 illustrates the formatting scheme for the downlink traffic channel of IS-95. As illustrated, each traffic frame is divided into groups of sixteen power control groups 32. Sixteen of such power control groups 32, here numbered 0–15 are illustrated in the Figure. Each of the power control groups 32 is further formatted into twenty-four modulation symbols 34. In the Figure, the formatting is represented by the expansion of the seventh power control group 32. Power control bits, of which the bits 42 and 44 are exemplary, replace pseudo-randomly two of the first sixteen symbols.

Figure 3:
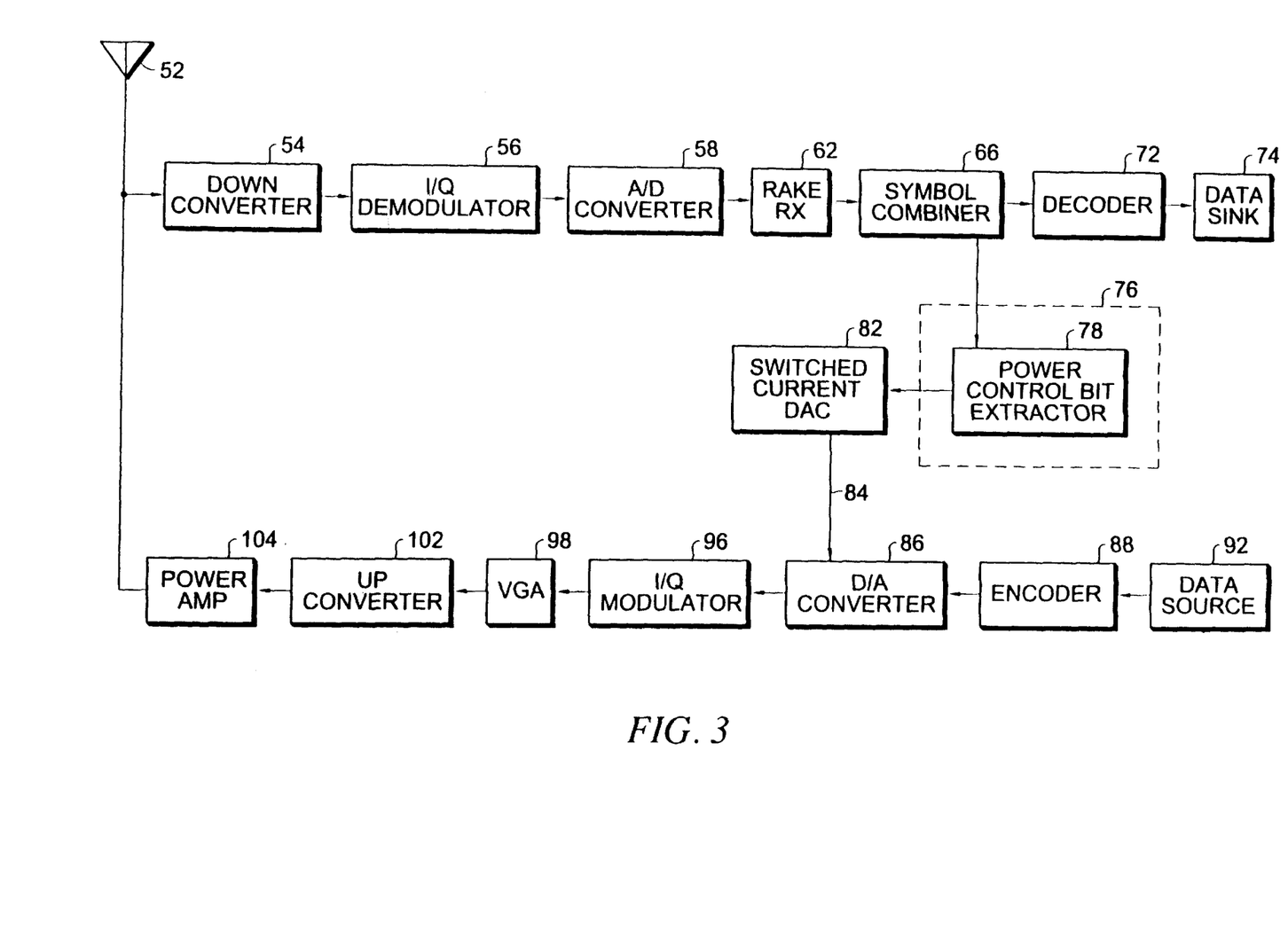
FIG. 3 illustrates a functional block diagram of the mobile station forming a portion of the communication system shown in FIG. 1.

FIG. 3 illustrates the mobile station, shown previously in FIG. 1, here operable pursuant to an embodiment of the present invention. In conventional manner, the mobile station is selectively tuned to the desired frequency channel. Electromagnetic signals are detected by the antenna transducer 52, converted into electrical form, and provided to a down converter 54. The down converter 54 translates the received signals to IF. The demodulator 56 converts the IF signal to baseband I- and Q-signals which are applied to ADCs (analog-to-digital converters) 58. The converters 58 convert the signals to digital form and provide such digitized signals to a rake receiver 62.

The rake receiver 62 includes a plurality of dynamically-assigned fingers (not shown). The rake receiver 62 further includes a symbol combiner 66 which combines symbols from the various fingers of the rake receiver.

Resultant symbols formed by the symbol combiner are provided to a decoder 72 which decodes the symbols provided thereto. The decoder 72 generates decoded signals which are provided to a data sink 74, such as a speaker element. The mobile station 14 further includes a controller 76 which extracts power control bits.

The power control bits extracted by the controller 76 are provided as a digital input to a switched-current exponential DAC (digital-to-analog converter) 82. The switched-current exponential DAC 82 generates an analog output signal on the line 84 indicating power control bit values.

The analog output signal of DAC 82 on line 84 is coupled to control I and Q DACs (digital-to-analog converters) 86, and thereby adjust the amplitude of the analog output signals produced by the converters 86. These DACs 86 receive digital encoded signals generated by an encoder 88 and originated from a data source 92. The DACs 86 generate analog output signals representative of the analog encoded signals and provides these signals to the input of an I/Q modulator 96. The modulator 96 generates modulated signals which are provided to a variable gain amplifier 98. The amplifier 98 amplifies the signals provided and provides amplified signals to an up-converter 102. In one embodiment, the gain of the variable gain amplifier 98 is determined by an open-loop gain control process.

The up-converter 102 generates up-converted signals which are provided to a power amplifier 104 to be amplified. Amplified signals generated by the power amplifier 104 are provided to the antenna transducer 52 to be radiated.

Figure 4:
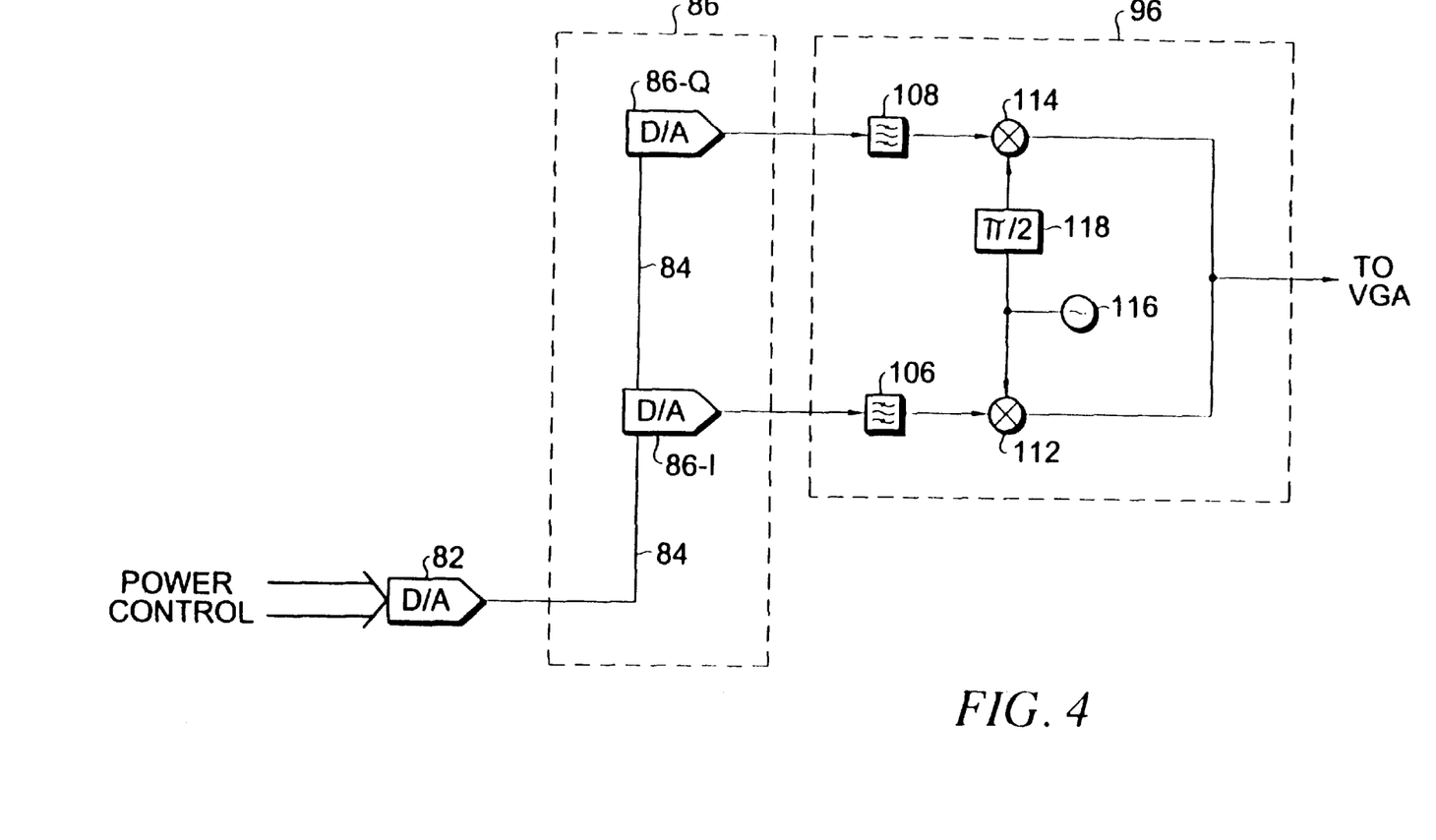
FIG. 4 illustrates a functional block diagram of an embodiment of the present invention, here forming a portion of the mobile station shown in FIG. 3.

FIG. 4 illustrates portions of the mobile station 10 shown in FIG. 3. More particularly, the switched-current exponential DAC 82, the I and Q DACs 86, and the I/Q modulator 96 are again shown. Here, the extracted power control bits are provided as digital inputs to the switched-current exponential DAC 82. This DAC 82 generates analog signals on the line 84 which are provided to control the I and Q digital DACs 86. The I and Q converters 86 are coupled to receive I and Q signals from the encoder 88 (shown in FIG. 3).

Analog signals generated by the converters 86 are filtered by filters 106 and 108, here represented to form portions of the I/Q modulator 96. Filtered signals generated by the filters 106 and 108 are provided to input terminals of mixer elements 112 and 114, respectively. Oscillating signals generated by an oscillator 116 are also provided to the mixers 112 and 114. The oscillating signal provided to the mixer circuit 114 is phase-shifted by a ninety degree phase shift by a phase shifter 118. Mixed signals generated by the mixer circuits 112 and 114 are combined together and thereafter applied to the variable gain amplifier 98 (shown in FIG. 3).

Figure 5:
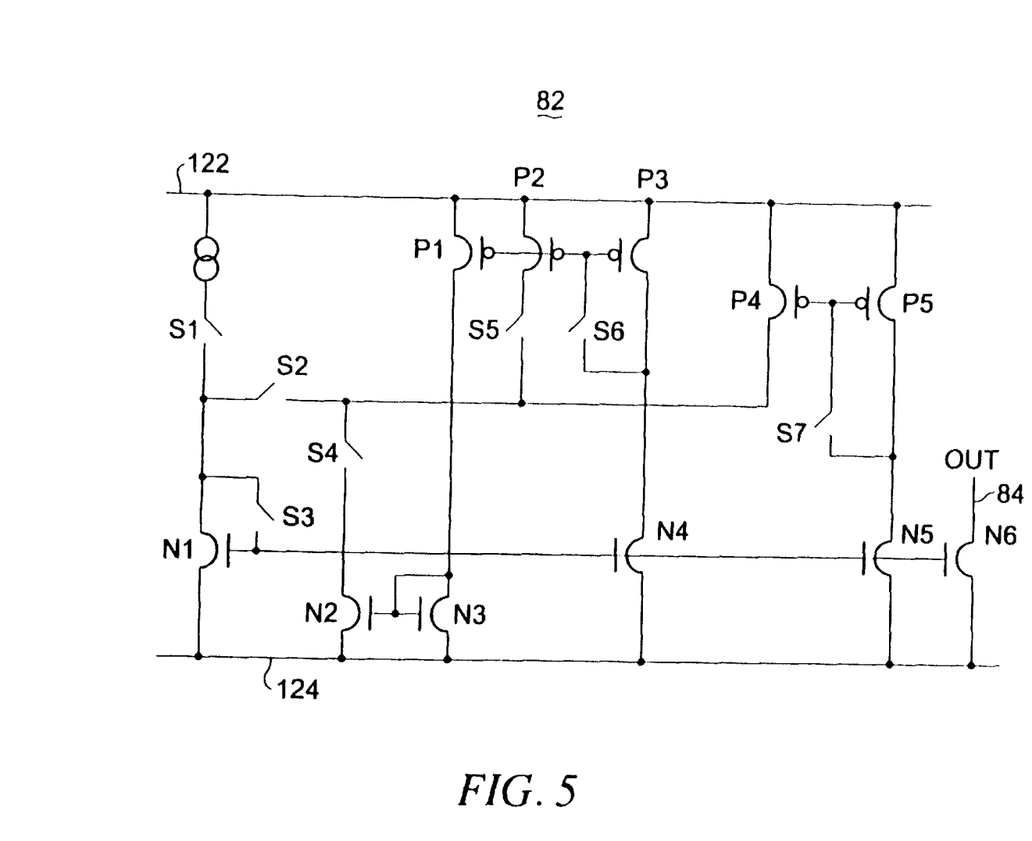
FIG. 5 illustrates a circuit schematic of the switched current, exponential DAC (digital-to-analog converter) of the apparatus of an embodiment of the present invention.

FIG. 5 illustrates the switched-current exponential DAC 82 of an embodiment of the present invention in greater detail. In the exemplary implementation, the DAC 82 is formed of MOSFETs (metal oxide semiconductor field effect transistors). In other implementations, the DAC 82 can analogously be formed of other types of devices.

The drain current, $I_D$, generated at the drain electrode of a MOSFET device is defined by the following equation:

$$I_D = \frac{\mu_S C_{ox}}{2} \frac{W}{L}(V_{gs} - V_T)^2$$

Wherein:

$\mu_s$ is the surface mobility;

$C_{ox}$ is the oxide capacitance;

W is the width of the transistor device;

L is the length of the transistor device;

$V_{gs}$ is the gate-to-source voltage of the transistor device; and $V_T$ is the threshold voltage of the transistor device.

A gate-source capacitance is also associated with the MOS transistor. An applied gate-source voltage to the transistor device charges such capacitance. When the applied voltage is removed, the drain current is unaffected, and the transistor device functions as an analog memory device.

The DAC 82 includes a plurality of N-channel transistor devices, here designated N1, N2, N3, N4 and N5. The DAC further includes a plurality of P-channel transistor devices, here designated by P1, P2, P3, P4 and P5. And, the DAC 82 further includes a plurality of switch elements, here designated by S1, S2, S3, S4, S5, S6, and S7. A bias source is applied to the DAC 82 on the line 122. Source electrodes of each of the P-channel transistors P1–P5 are coupled to the line 122. The DAC 82 further includes a second line 124, here coupled to a common potential, to which each source of the N-channel transistors, transistors N1–N6 are coupled.

Opening and closing of the switches S1–S7 describe the operation of the switched current exponential DAC 82. At start-up, the switches S1 and S3 are closed. The reference current is applied to the source of transistor N1 and transistor N1 develops a gate-source voltage corresponding to the level of the drain current applied. All of the current is applied to transistor N1 as the gate current of an MOS transistor is negligible, ideally zero value.

Thereafter, the switch S3 is opened, with the gate-source voltage stored by the transistor N1. Switch S1 is then opened while switch S2 is closed.

Thereafter, the switches S6 and S7 are closed. The transistor N1 and N5 form a current mirror, and the drain current of the transistor N1 is equal to the drain current of the transistor N5. Analogously, the transistors P4 and P5 also form a current mirror and the drain currents of the transistors P4 and P5 are also equal to one another. The transistors N1, N5, P4 and P5 together form a loop, each with equal current levels.

The transistors N1 and N4 also form a current mirror. The transistor N4, however, is sized differently than that of the transistor N1 and, assuming the transistors N1 and N4 to be of equal lengths, the drain current, $I_{D4}$ of the transistor N4 is defined by the following equation:

$$I_{D4} = I_{D1}\left(\frac{W_4}{W_1}\right)$$

Wherein:

$I_{D1}$ is the drain current of the transistor N1;

$W_4$ is the width of the transistor N4; and $W_1$ is the width of the transistor N1.

The ratio of the widths of the transistors N4 and N1 are selected to effectuate a selected control step, such as 1 dB, 0.5 dB, or 0.25 dB.

Opening and closing of the switches S4 and S5 are made to effectuate decrement and increment commands of the control steps, respectively. To effectuate an increment command, the switch S5 is closed together with the switches S6 and S7. In this position, the drain current of the transistor N4 is mirrored by the transistors P2 and P3. The drain current of the transistor P2 is thereby caused to be added to the drain current of transistor P4, thereby increasing the drain current of the transistor N1 from its original value. The gate-source capacitances of the transistors P2 and P4 are also caused to be charged. The switches S6 and S7 are then opened and a switch S3 is then closed. The gate-source voltage of the transistor N1 increases to reflect the new, higher value of the drain current. The transistor N4 then operates at the new current level. To effectuate the switched-current operation of the DAC 82, two non-overlapping clock pulses are required. Here, the switch S3 is opened and closed pursuant to a first clock, and the switches S4–S7 are operated with a second clock. Appropriate clocking of the switches also minimizes leakage of the MOS transistors forming the DAC 82.

Through operation of the DAC 82, the current level generated at the output line 84 is governed by the following equation:

$$i = N\hat{i}$$

Wherein:

N is $10^{dB/20}$; and $\hat{i}$ is the previous current level generated by the DAC 82.

A current-step increment is achieved by adding a fraction of the original value, $\hat{i}$, to itself. And, conversely, a decrement is achieved by reducing the original value, $\hat{i}$, by a similar fraction.

The fractional change is related to the control-step size, determined by the ratio of the width of the transistors N4 and N1.

For instance, when the control step is of 0.25 dB, utilizing the above equation, the fractional decrement of current levels is −2.84%, and the fractional increment of current levels is +2.92%. Analogously, when the control step size is 0.5 dB, the fractional decrement is −5.59%, and the fractional increment in current levels is +5.93%. And, when the control step size is 1.0 dB, the fractional decrement is −10.87%, and the fractional increment of current levels is +12.2%.

Thereby, for a given control step size, determined by the ratio of the width of the transistors N4 and N1, successive current level increments or decrements are caused to be generated on the line 84 responsive to detection at the mobile station of the power control bits. For instance, for eight successive logic Hi power control bits, with the control steps set at 1.0 dB, an increase of 8 dB power level is caused to be effectuated.

Figure 6:
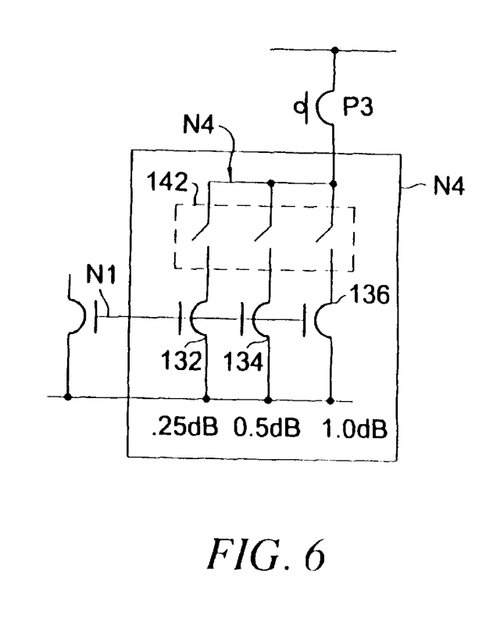
FIG. 6 illustrates a circuit schematic of a portion of the switched current, exponential DAC shown in FIG. 5, of a further embodiment of the present invention.

FIG. 6 illustrates the transistor N4, forming a portion of the DAC 82 shown in FIG. 5 of an embodiment of the present invention, together with the transistor N1 and transistor P3.

In this embodiment, the transistor N4 is selected between one of three transistors, transistor 132, transistor 134, or transistor 136. Each of the transistors 132, 134, and 136 are coupled in parallel to one another through a switch 142. Each of the transistors 132, 134, and 136 is differently sized, creating a different width ratio with the transistor N1. The control step size is selected through this switch 142 and a manner is provided to control the power level of the transmitted signal. The circuit 82 is of simple construction, capable of quick response to power control commands.

The previous descriptions are of preferred examples for implementing the invention, and the scope of the invention should not necessarily be limited by this description. The scope of the present invention is defined by the following claims.

I claim:

1. In a two-way communication device operable to receive a power control bit, the power control bit for indicating at least a relative power level at which a communication signal originated by the two-way communication device is to be transmitted, an improvement of apparatus for controlling a gain level of an amplifier of the communication device which amplifies the communication signal originated at the communication device, said apparatus comprising:

an exponential converter coupled to receive indications of each successive power control bit received at the two-way communication device, said exponential converter for generating a reference signal step-wise exponentially related to each successive power control bit;

a communication-signal DAC (digital-to-analog converter) coupled to receive indications of the communication signal to be transmitted by the two-way communication device and the reference signal generated by said exponential converter, said communication signal DAC for generating an analog representation of the indications of the communication signal, the reference signal determinative of levels of the analog representation of the indications of the communication signal.

2. The apparatus of claim 1 wherein said exponential converter comprises a switched-current exponential DAC (digital-to-analog converter), the reference signal generated by said switched-current exponential DAC being a present current level step-wise exponentially related to a previous current level.

3. The apparatus of claim 2 wherein the step-wise exponential relationship by which the present current level is related to the previous current level comprises a control step, the control step determinative of an incremental change in value of the present current level relative to the previous current level.

4. The apparatus of claim 3 wherein the present current level is related to the previous current level multiplied by a step-factor, the step-factor being an exponential value defined by an exponent, the exponent being related to the control step.

5. The apparatus of claim 4 wherein the present current level, defined as I, is related to the previous current level î by:

$$i = N\hat{i}$$

wherein:

$$N = 10^{(control\ step/20)}.$$

6. The apparatus of claim 3 wherein the control step is selectably from a first step-size and at least a second step-size.

7. The apparatus of claim 6 wherein the first step-size and the at least the second step-size comprise decibel-valued steps.

8. The apparatus of claim 1 wherein the communication device is operable to receive a series of power control bits during a selected time period, and wherein said exponential converter generates the reference signal to be of successive values, successive ones of the values of the reference signal being incrementally related to preceding ones of the values of the reference signal.

9. The apparatus of claim 6 wherein said exponential converter is further coupled to receive increment/decrement indications, the increment/decrement indications representing in which direction successive ones of the values of the reference signal are related to preceding ones of the values of the reference signal.

10. The apparatus of claim 1 wherein the two-way communication device includes an I/Q modulator and wherein said communication-signal DAC forms a portion of the I/Q modulator.

11. The apparatus of claim 10 wherein the indications of the communication signal comprise an I component portion and a Q component portion and wherein said communication-signal DAC comprises a first communication-signal DAC and a second communication-signal DAC, the first communication-signal DAC coupled to receive the I component portion and the second communication-signal DAC coupled to receive the Q component portion.

12. The apparatus of claim 11 wherein both said first communication-signal DAC and said second communication-signal DAC are coupled to receive the reference signal generated by said exponential converter.

13. The apparatus of claim 8 wherein the series of power control bits of which the two-way communication device is operable to receive are interleaved with data bits, the data bits, together with the power control bits interleaved therein divided into frames, and wherein the reference signal generated by said exponential converter is step-wise exponentially related to each of the successive power control bits within a frame.

14. The apparatus of claim 13 wherein said exponential converter is reset at each frame into with the data bits, together with the power control bits is divided.

15. A method for controlling a gain level of an amplifier of a transmitter portion of a two-way communication device, the two-way communication device having a receiver portion for receiving power control bits, the power control bits indicating at least a relative power level at which a communication signal originated at the two-way communication device is to be transmitted, said method comprising:

generating a reference signal step-wise exponentially related to each successive power control bit received at the two-way communication device;

applying the reference signal generated during said operation of generating to a DAC (digital-to-analog converter);

applying indications of the communication signal to be transmitted by the two-way communication device to the DAC; and forming an analog representation of the indications of the communication signal, the reference signal determinative of levels of the analog representation of the indications of the communication signal.

16. The method of claim 15 wherein said operation of generating the reference signal is performed by a switched-current exponential DAC (digital-to-analog converter).

17. The method of claim 16 wherein the reference signal generated during said operation of generating is of a present current level, the present current level step-wise exponentially related to a previous current level.

18. The method of claim 17 wherein the step-wise exponential relationship of the present current level to the previous current level comprises a control step, the control step being determinative of an incremental change in value of the present current level relative to the previous current level.

19. The method of claim 18 further comprising selecting the control step to be selectably from a first step-size and at least a second step-size.

20. Gain control apparatus for a transmit portion of a two-way communication device, the two-way communication device operable to receive a succession of power control bits indicative of a relative power level at which a communication signal is to be transmitted by the transmit portion, said gain control apparatus comprising:

an exponential converter coupled to receive indications of each successive power control bit received at the two-way communication device, said exponential converter for generating a reference signal step-wise exponentially related to each successive power control bit;

a communication-signal DAC (digital-to-analog converter) coupled to receive indications of the communication signal to be transmitted by the two-way communication device and the reference signal generated by said exponential converter, said communication signal DAC for generating an analog representation of the indications of the communication signal, the reference signal determinative of levels of the analog representation of the indications of the communication signal.

\* \* \* \* \*